Feb. 18, 1969

H. ETTISCHER 3,427,945

SINGLE LENS REFLEX CAMERA

Filed Feb. 1, 1966

HELMUT ETTISCHER
INVENTOR.

BY Robert W. Hampton

Steve W. Grenlaw

ATTORNEYS

HELMUT ETTISCHER
INVENTOR.

BY Robert W. Hampton
Steve W. Glenbau
ATTORNEYS

HELMUT ETTISCHER
INVENTOR.

BY Robert W. Hampton
Steve W. Grembau
ATTORNEYS

United States Patent Office 3,427,945
Patented Feb. 18, 1969

3,427,945
SINGLE LENS REFLEX CAMERA
Helmut Ettischer, Ruit, Kreis, Esslingen, Germany, assignor to Eastman Kodak Company, Rochester, N.Y., a corporation of New Jersey
Filed Feb. 1, 1966, Ser. No. 524,034
Claims priority, application Germany, Feb. 5, 1965, K 55,196
U.S. Cl. 95—42            5 Claims
Int. Cl. G03b *19/12*

ABSTRACT OF THE DISCLOSURE

A control device for a single lens reflex camera for controlling operation of the mirror and shutter mechanisms. The control device consists of a pair of relatively movable members arranged to tension drive springs for each of the mirror and shutter mechanisms upon movement of the members from a normal position. One of the drive springs for the mirror and shutter mechanisms normally maintains the two control members in its normal position.

This invention relates generally to cameras, and more specifically to an improved single lens reflex camera.

Single lens reflex cameras having means for returning a mirror from its non-viewing position to its viewing position immediately after the exposure are well known in the art. It is also known in such cameras to provide energy storing means such as springs responsive to the actuation of the film transport and shutter cocking means to store energy for driving or controlling the operation of some of the camera parts such as the mirror. Many of these prior known single lens reflex cameras are of relatively complicated construction containing many moving parts that have to be manufactured to close tolerances in order for the camera to operate satisfactorily. In view of the close tolerances and complicated construction, the reliability and repeatability of the camera is greatly impaired.

It is an object of this invention to provide an improved single lens reflex camera that is of simple design and construction, thoroughly reliable and efficient in operation, and economical to manufacture.

Another object of the invention is to provide a single lens reflex camera having an improved lever control system for operating the mirror, shutter and diaphragm in timed relation.

Another object of the invention is to provide an improved single lens reflex camera constructed of parts that do not have to be manufactured to close tolerances.

To attain these objects, the invention includes within its scope a first spring-driven actuating means operatively connected to the mirror and shutter mechanisms of a single lens reflex camera, a second spring-driven actuating means operatively connected to the diaphragm mechanism thereof, and control means for correlating the actuating means. The control means include a pair of relatively movable members arranged so that the drive spring for the first actuating means tends to urge the two control members into a normal position relative to one another, and means for moving the members from their normal position to tension both of said springs.

Figure 1:
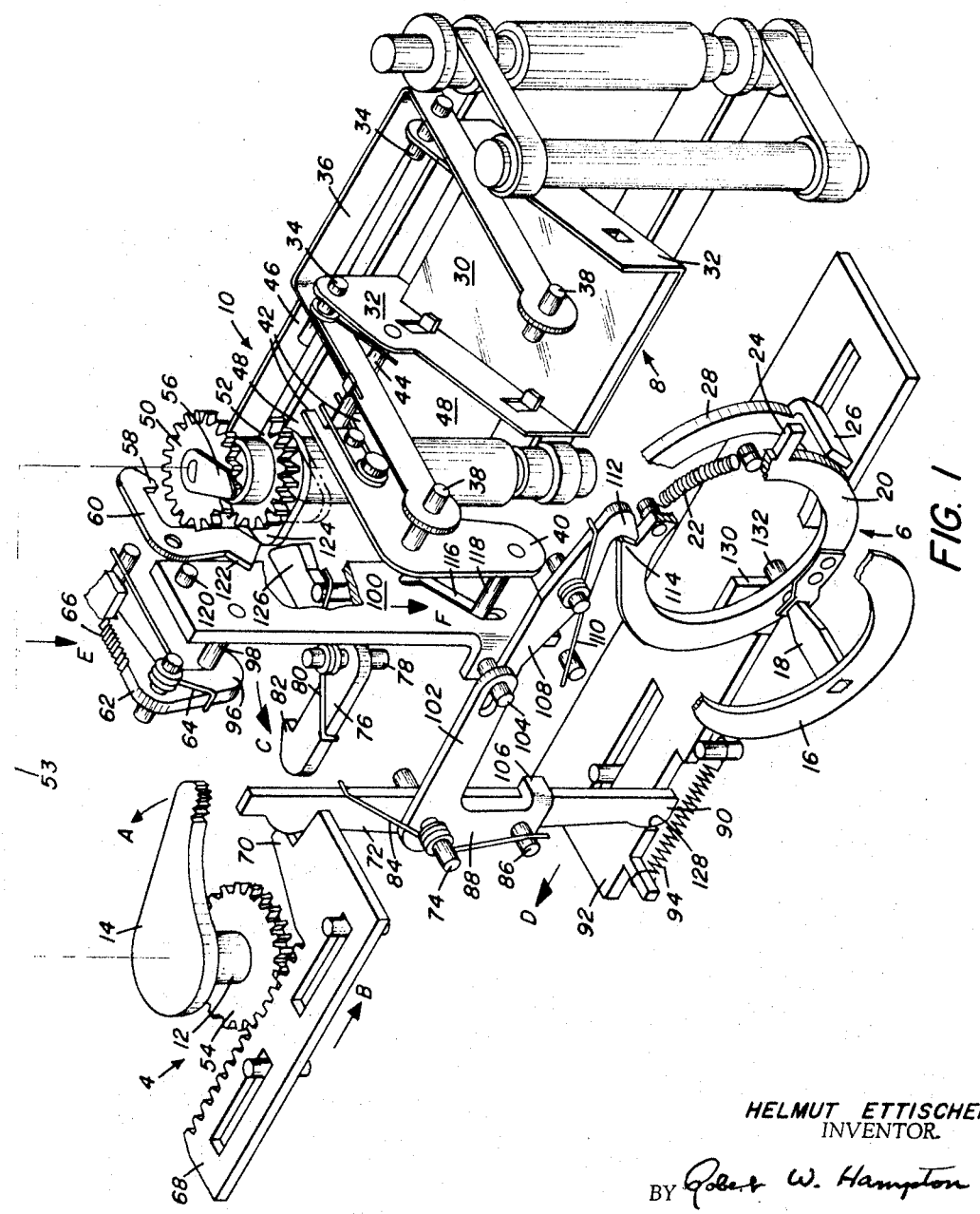
Figure 2:
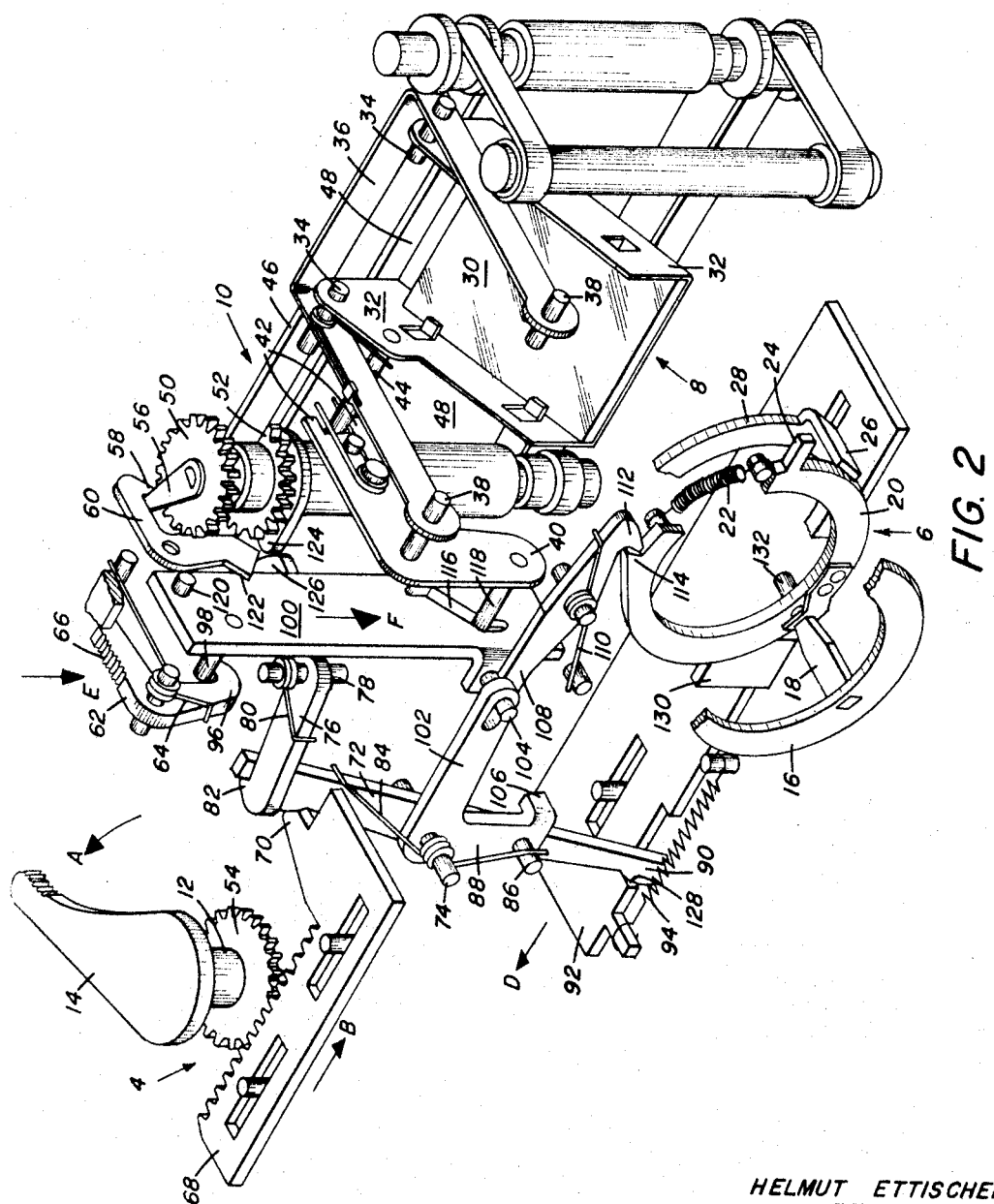
Figure 3:
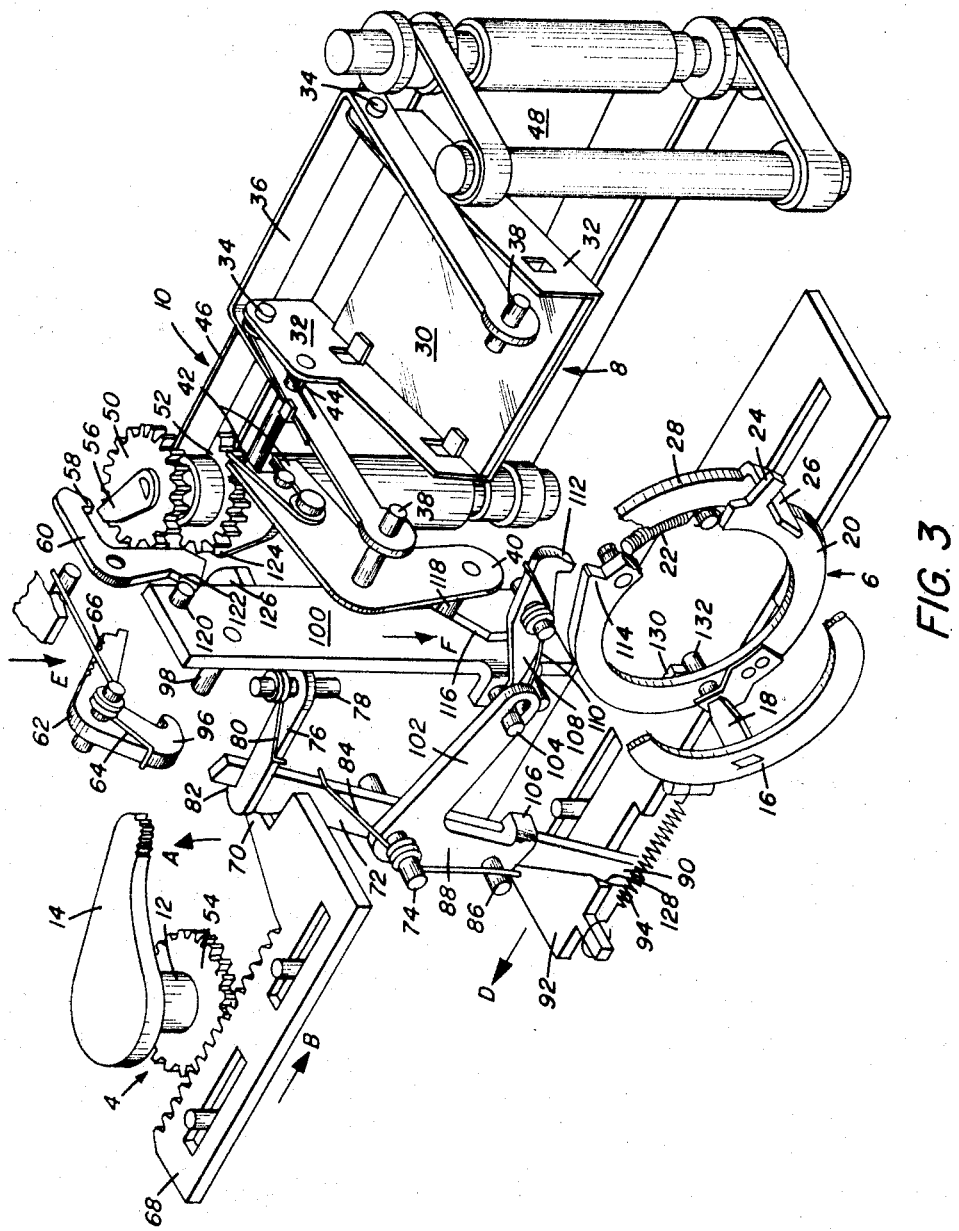

Objects and advantages other than those set forth above will be apparent from the following description when read in connection with the accompanying drawings, in which:

FIG. 1 is a schematic view in perspective of a single-lens reflex camera shown in a normal position following an exposure with the diaphragm in its wide-open position and the mirror in its viewing position, the remaining parts of the camera having been omitted for purposes of clarity;

FIG. 2 is a view similar to FIG. 1 showing the position of the camera parts after the film has been advanced or transported to position a new frame in position for exposure, and the shutter has been cocked; and FIG. 3 is a view similar to FIG. 1 and 2 showing the position of the camera parts following depression of the exposure release button with the diaphragm in its preselected position, the mirror in its non-viewing position, and the shutter released to begin its run-down.

Referring to the drawings, a single lens reflex camera is disclosed essentially comprising a film winding mechanism 4 for advancing the film one frame at a time for exposure, a diaphragm mechanism 6 for setting the diaphragm opening to a preselected setting depending upon the exposure conditions, a mirror mechanism 8 movable between viewing and non-viewing positions, and a shutter mechanism 10 for making an exposure, each of which will now be described.

As is well known in the art, the film winding mechanism 4 for advancing each frame of film for exposure comprises a shaft 12 having an arm 14 secured to one end thereof for rotating shaft 12, the opposite end of which is drivingly connected to a suitable take-up reel, not shown, through some suitable one-way clutch mechanism, not shown.

The diaphragm mechanism 6, only a portion of which is shown, comprises a rotatable diaphragm ring 16 for controlling the movement of diaphragm blades, not shown, between closed and open positions for varying the diaphragm opening in a manner well known in the art. The diaphragm ring 16 is connected by a link 18 to a diaphragm setting ring 20 which is biased by a spring 22 in a clockwise direction. The setting ring 20 has a lug 24 movable into engagement with a stop lug 26 on a diaphragm presetting ring 28. The presetting ring 28, which may be adjustable manually or by any suitable automatic exposure setting mechanism, controls the position of setting ring 20 and diaphragm ring 16 during the actual exposure period and thereby determines the diaphragm opening for any exposure.

The mirror mechanism 8, which is the subject of U.S. application Ser. No. 498,437, filed Oct. 20, 1965 in the name of Ettischer and Baisch, essentially comprises a mirror 30 secured to a bracket 32 pivotally mounted on stub shafts 34. The shafts are supported by a U-shaped bracket 36 which is pivotal about shafts 38. The mirror 30 is movable between its viewing and non-viewing positions by a control lever 40 pivotal about shaft 38 and having spaced fingers 42 at one end for moving one end of a rod 44 extending therebetween, the opposite end of rod 44 being secured to bracket 32. Pivotal movement of control lever 40 moves mirror 30 between its viewing and non-viewing positions.

The shutter mechanism 10 comprises any suitable focal plane shutter having two curtains 46, 48 movable relative to one another to momentarily expose the film for a predetermined period of time in a manner well known in the art. The curtains 46, 48 are controlled by coaxially mounted gears 50, 52, respectively which are moved by any suitable cocking mechanism in a counter-clockwise direction to cock the curtains against the bias of springs, not shown. A gear 54 driven by the film winding mechanism 4 is operatively coupled to gears 50, 52, by a suitable gear train or the like, not shown, but schematically indicated by the broken line 53, for cocking the shutter as the film is advanced an exposure frame. The focal plane shutter is retained or latched in its cocked position by an arm 56 movable with gear 50 to a latched position, in which arm 56 moves behind and into engagement with a hook 58 of a spring biased latch lever 60.

The camera release mechanism comprises a pivotal lever 62 biased by a spring 64 in a counterclockwise direction. The lever 62 has a ribbed arm 66 manually engageable by the finger of an operator.

The aforementioned diaphragm mechanism 6, mirror mechanism 8 and shutter mechanism 10 are operated in timed relation by actuating means comprising plates 92, 100. The actuating plates 92, 100 are driven by yieldable means comprising springs 94, 84 respectively. The control means for the actuating plates and springs comprises a pair of relatively movable members, a lever 72 and bellcrank 88, arranged so that drive spring 84 tends to urge them into a normal position, in which a lug 106 on bellcrank 88 engages one side of lever 72 as seen in FIG. 1. A drive means for tensioning springs 84, 94 comprises a slideable gear rack 68 driven by gear 54 upon movement of arm 14 to move lever 72 to a position in which it is latched by a latch lever 76.

The details of this novel arrangement for controlling and correlating the operation of these various mechanisms can best be described in conjunction with a description of the operation of the camera as a whole. Initially, the camera is in the normal position shown in FIG. 1 with the diaphragm blades in their wide-open position, the mirror 30 in its viewing position, and the shutter mechanism 10 in its run-down position. The operator moves arm 14 of the film winding mechanism 4 in the counterclockwise direction as shown by arrow A to advance the film one frame and to cock the shutter. Movement of arm 14 causes gear 54 to move gear rack 68 in the direction of arrow B causing a lug 70 thereon to engage and pivotally move lever 72 about a shaft 74 in a clockwise direction. As lever 72 is moved, it engages and cams latch lever 76, which is pivotally mounted on a shaft 78, in the direction of arrow C against the bias of a spring 80. The lever 72 moves past the end of lever 76, and a hook 82 thereon is moved in front of lever 72 for holding it in its latched position. As lever 72 is moved to its latched position, it tensions spring 84, one end of which is held by a pin 86 on bellcrank 88, also pivotal about shaft 74. The end 90 of lever 72 moves slideable plate 92 in the direction of arrow D tensioning spring 94. The shutter gears 50, 52 are rotated in a counterclockwise direction by the film winding mechanism 4 into their cocked position with arm 56 moving behind and into engagement with hook 58 of latch lever 60. The camera parts are now in the position shown in FIG. 2.

Now assuming the operator wishes to make an exposure, diaphragm presetting ring 28 is manually or automatically set to take into account the subject and illumination, etc. Since the diaphragm blades are in their wide-open position, and the mirror in its viewing position, the operator may view the subject image in the viewfinder, not shown, and may then depress shutter release arm 66 in the direction of arrow E to make an exposure. Depression of arm 66 causes a hook 96 at one end thereof to release a pin 98 on a vertically mounted slideable plate 100 which is then driven downwardly in the direction of arrow F by the previously tensioned spring 84. The downward movement of plate 100 is achieved by pivotal movement imparted to bellcrank 88 by spring 84 causing its slotted arm 102 to carry along a pin 104, held in the slot and secured to plate 100. The bellcrank 88 has a lug 106 which in its normal position as seen in FIG. 1 is urged into engagement with lever 72 by spring 84. Downward movement of plate 100 causes pin 104 to engage a pivotal lever 108 and urge it in a counterclockwise direction against the bias of its spring 110 causing a hook 112 at the end thereof to release a lug 114 on the diaphragm setting ring 20. The setting ring 20 is immediately urged by its spring 22 in a clockwise direction causing lug 24 thereon to engage stop lug 26 on the diaphragm presetting ring 28. The diaphragm blades are now in the preset condition for the exposure. Also, movement of plate 100 downwardly pivots control lever 40 in a counterclockwise direction for moving mirror 30 into its non-viewing position by virtue of a slot 116 and pin 118 connection, the pin 118 having one end secured to lever 40 and its opposite end extending into slot 116. As plate 100 reaches its lowermost position as seen in FIG. 3, a pin 120 thereon strikes a lug 122 on latch lever 60, and cams it in a counterclockwise direction causing hook 58 to release arm 56. This releases the first curtain 46 which begins its run-down, and after a predetermined time period set by the shutter mechanism 10 as is well known in the art, the second curtain 48 is released by curtain 46 to make an exposure of a predetermined time interval. After the exposure is completed and curtain 48 reaches the end of its run-down, a cam 124 drivingly connected to gear 52 strikes an arm 126 of lever 76 urging it in the direction of arrow C for releasing lever 72. Immediately, tensioned spring 94 urges plate 92 to the right as seen in FIG. 3 causing a lug 128 thereon to urge lever 72 in a counterclockwise direction. As lever 72 is moved, it engages lug 106 urging bellcrank 102 in a counterclockwise direction, moving plate 100 upwardly until pin 98 thereof is latched by shutter release lever 62. Further movement of plate 92 to the right, causes a lug 130 thereon to engage a pin 132 on diaphragm setting ring 20 for urging the ring in a counterclockwise direction until lug 114 thereof is engaged by hook 112 of lever 108. This holds the diaphragm mechanism with the diaphragm blades in their wide-open position. Also, as plate 100 is moved upwardly, it returns mirror 30 to its viewing position. The camera parts now assume their normal position as seen in FIG. 1.

The invention has been described in detail with particular reference to one embodiment thereof, but it will be understood that variations and modifications can be effected within the spirit and scope of the invention as described hereinabove and as defined in the appended claims.

I claim:
1. A single lens reflex camera comprising:
 a mirror movable between viewing and non-viewing positions;
 a shutter mechanism;
 first yieldable means;
 first actuating means driven by said first yieldable means and coupled to said mirror and said shutter mechanism for operating said mirror and shutter mechanism in timed relation;
 a diaphragm mechanism;
 second yieldable means;
 second actuating means driven by said second yieldable means and coupled to said diaphragm mechanism for operating said diaphragm mechanism in timed relation to said mirror and said shutter mechanism;
 control means for said first and second actuating means;
 said control means comprising a first member coupled to said first actuating means, and a second member movable relative to said first member and coupled to said second actuating means, said first yieldable means being interposed between said first and second members for urging said members into normal positions in which they are yieldably held together; and
 means for moving at least one of said first and second members from its normal position for tensioning said first and second yieldable means.

2. The invention according to claim 1 wherein said first and second members are pivotally mounted about the same shaft.

3. The invention according to claim 1 wherein said first and second members comprise a pair of pivotally mounted levers, one of said levers having a lug engageable with a portion of the other when said members are in their normal position.

4. The invention according to claim 1 wherein said first actuating means comprises a reciprocally movable first plate, said second actuating means comprises a reciprocally movable second plate, said first member comprises a first pivotal lever having one end connected to said first plate, said first lever further having a lug, said second member comprises a second pivotal lever having one end connected to said second plate, said second lever having a portion thereof urged into engagement with said lug by said first yieldable means, and said moving means comprises a manually driven third plate connected to said second lever.

5. The invention according to claim 4 wherein said first and second levers are pivotal about the same shaft.

References Cited

UNITED STATES PATENTS

| | | | |
|---|---|---|---|
| 2,952,197 | 9/1960 | Goshima | 95—42 |
| 3,075,443 | 1/1963 | Reiche | 95—42 |
| 3,240,136 | 3/1966 | Fujimori | 95—42 XR |
| 3,319,551 | 5/1967 | Ettischer et al. | 95—42 |

NORTON ANSHER, *Primary Examiner.*

F. L. BRAUN, *Assistant Examiner.*